(12) United States Patent
Watts

(10) Patent No.: US 11,366,372 B1
(45) Date of Patent: Jun. 21, 2022

(54) ROTATING CAMERA HEAD

(71) Applicant: Titus Gadwin Watts, San Francisco, CA (US)

(72) Inventor: Titus Gadwin Watts, San Francisco, CA (US)

( * ) Notice: Subject to any disclaimer, the term of this patent is extended or adjusted under 35 U.S.C. 154(b) by 0 days.

(21) Appl. No.: 17/175,242

(22) Filed: Feb. 12, 2021

Related U.S. Application Data

(63) Continuation-in-part of application No. 16/877,183, filed on May 18, 2020, now Pat. No. 11,009,779.

(60) Provisional application No. 62/975,553, filed on Feb. 12, 2020.

(51) Int. Cl.
*G03B 17/08* (2021.01)
*G08B 13/196* (2006.01)
*G03B 17/56* (2021.01)

(52) U.S. Cl.
CPC ........... *G03B 17/08* (2013.01); *G03B 17/561* (2013.01); *G08B 13/1963* (2013.01)

(58) Field of Classification Search
CPC ................................................. G08B 13/1963
See application file for complete search history.

(56) References Cited

U.S. PATENT DOCUMENTS

| | | | | |
|---|---|---|---|---|
| 5,946,127 | A * | 8/1999 | Nagata ................. | H04N 5/2259 310/90.5 |
| 6,879,082 | B2 * | 4/2005 | Erten ................... | H02K 41/031 310/112 |
| 8,715,033 | B2 * | 5/2014 | Smoot .................. | H04N 5/2251 446/131 |
| 8,767,120 | B2 * | 7/2014 | Takizawa ........... | H04N 5/23264 348/208.7 |
| 9,090,214 | B2 * | 7/2015 | Bernstein ............... | A63H 27/12 |
| 9,391,481 | B2 * | 7/2016 | Kim ......................... | H02K 5/04 |
| 10,372,021 | B2 * | 8/2019 | Lenzo .................. | H04N 5/2252 |
| 2009/0297137 | A1 * | 12/2009 | Entis ...................... | G03B 17/02 396/428 |

* cited by examiner

*Primary Examiner* — Leon W Rhodes, Jr.
(74) *Attorney, Agent, or Firm* — Plager Schack LLP; Mark H. Plager; Eric Liou

(57) ABSTRACT

A rotating camera head is configured to protect cameras during inclement weather. The rotating camera head has a top plate joined to an inner semisphere outer surface and a camera mount. A bottom plate is joined to an inner semisphere inner surface and the camera mount with a plurality of long mount plate bolts and nuts. A rotator assembly is joined to an opening in the inner semisphere. A transparent sphere first side is arranged against a first metallic ball in the rotator assembly. A transparent sphere second side is arrange against a second metallic ball. A waterproof door is arranged on the transparent sphere. A camera is arranged within the transparent sphere. A plurality of cover panels is joined to the camera mount spacer and covering the rotator assembly. The plurality of cover panels protect the rotator assembly and the camera from inclement weather.

7 Claims, 5 Drawing Sheets

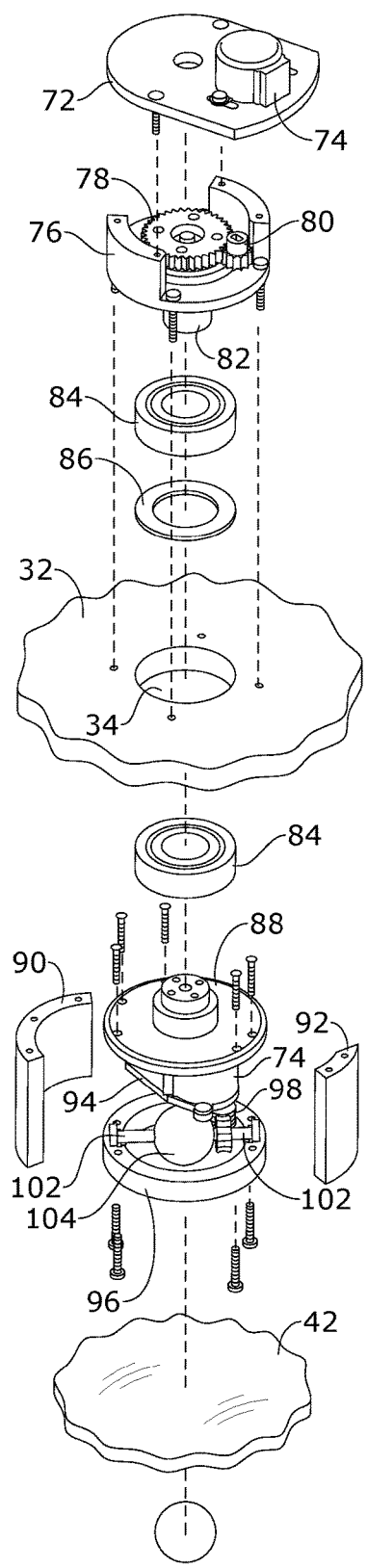
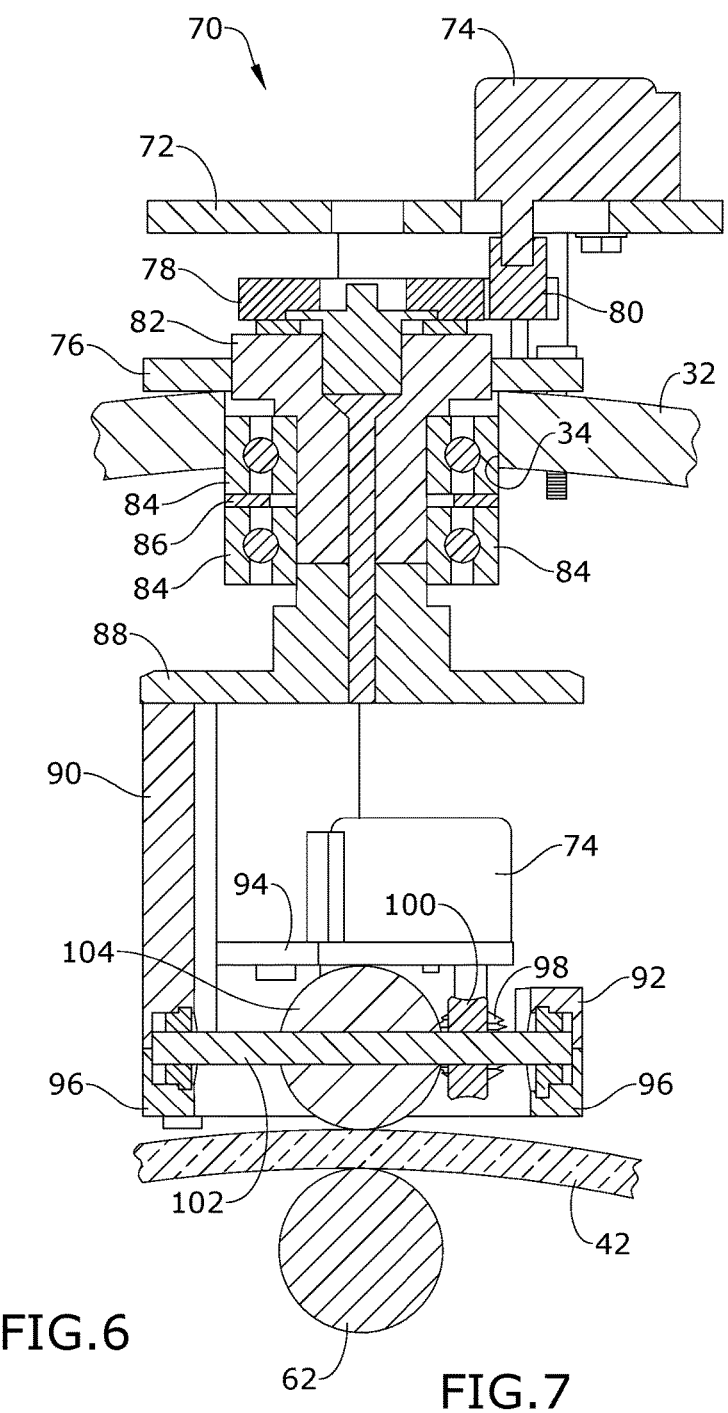
FIG.6
FIG.7

ROTATING CAMERA HEAD

RELATED APPLICATION

This application claims priority to provisional patent application U.S. Ser. No. 62/975,553 ("the '553 application") filed on Feb. 12, 2020.

This application is a continuation-in-part of non-provisional patent application U.S. Ser. No. 16/877,183 ("the '183 application") filed on May 18, 2020. The '183 application claims priority to provisional patent application U.S. Ser. No. 62/820,331 ("the '331 application") filed on Mar. 19, 2019.

The entire contents of the '553 application, the '183 application, and the '331 application are herein incorporated by reference.

BACKGROUND

The embodiments herein relate generally to camera technology.

Prior to embodiments of the disclosed invention, motion cameras were often outside in the elements. They were exposed to harsh weather that effects the camera parts and the footage that was taken. There was no protective covering for camera heads. Embodiments of the disclosed invention that solve that problem.

SUMMARY

A rotating camera head is configured to protect cameras during inclement weather. The rotating camera head has a top plate joined to an inner semisphere outer surface and a camera mount. A bottom plate is joined to an inner semisphere inner surface and the camera mount with a plurality of long mount plate bolts and nuts. A rotator assembly is joined to an opening in the inner semisphere. A transparent sphere first side is arranged against a first metallic ball in the rotator assembly. A transparent sphere second side is arrange against a second metallic ball. A waterproof door is arranged on the transparent sphere. A camera is arranged within the transparent sphere. A plurality of cover panels is joined to the camera mount spacer and covering the rotator assembly. The plurality of cover panels protect the rotator assembly and the camera from inclement weather.

BRIEF DESCRIPTION OF THE FIGURES

The detailed description of some embodiments of the invention is made below with reference to the accompanying figures, wherein like numerals represent corresponding parts of the figures.

FIG. 6 shows a detail exploded view of one embodiment of the rotator assembly of the present invention;

FIG. 7 shows a section view of one embodiment of the present invention taken along line 6-6 in FIG. 2.

DETAILED DESCRIPTION OF CERTAIN EMBODIMENTS

Figure 1:
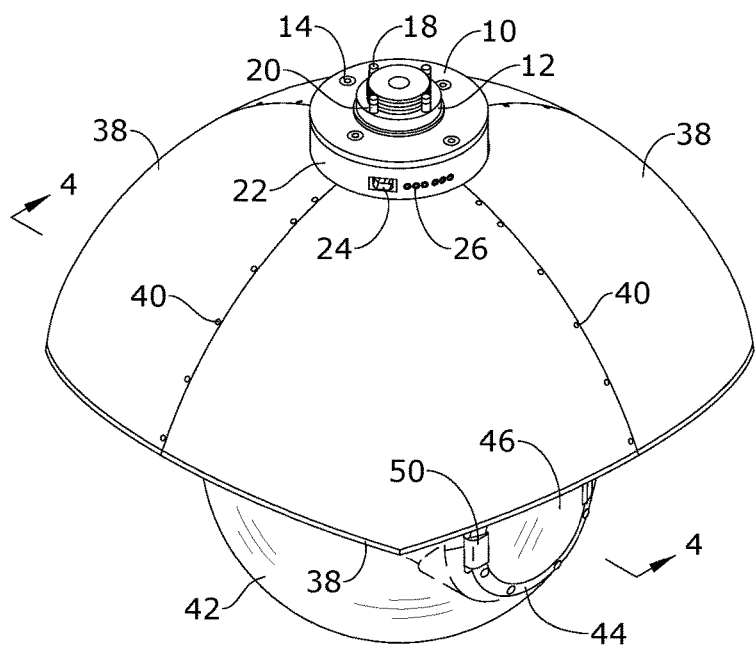
FIG. 1 shows a top perspective view of one embodiment of the present invention.
Figure 2:
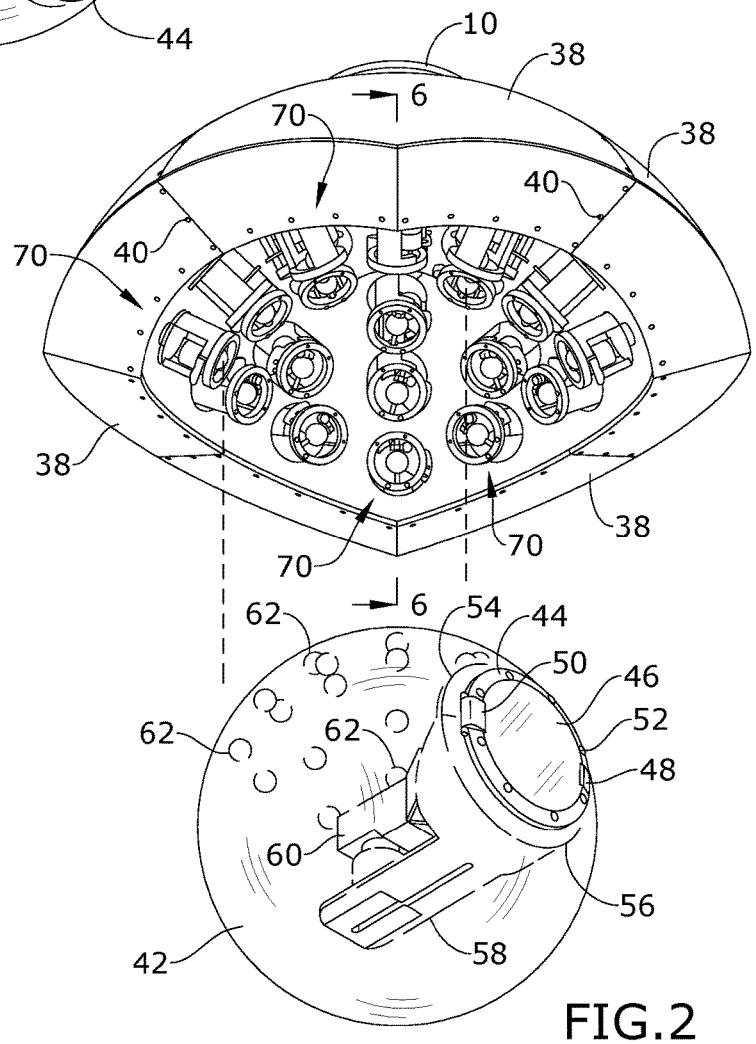
FIG. 2 shows a bottom exploded perspective view of one embodiment of the present invention.
Figure 3:
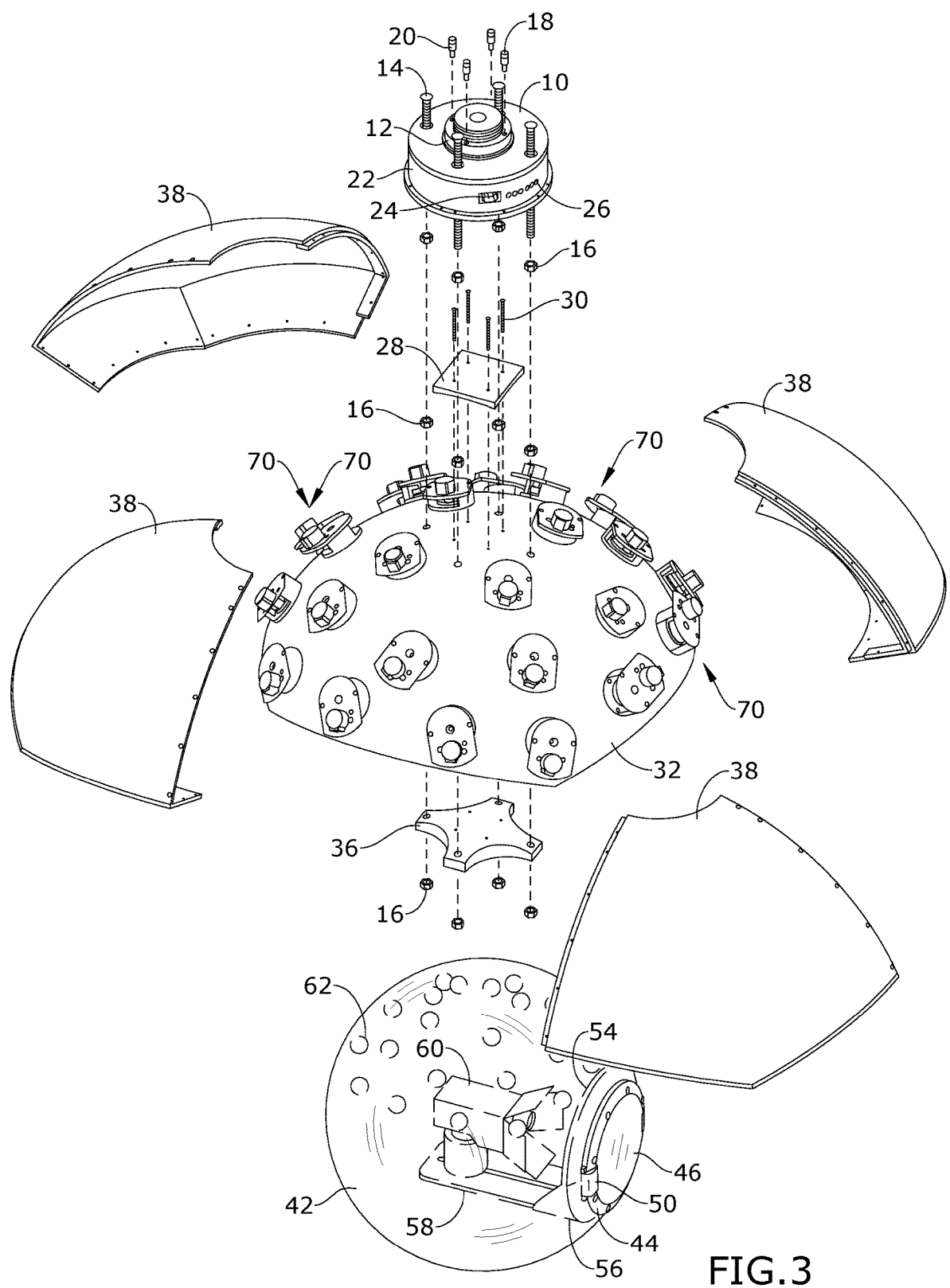
FIG. 3 shows a top exploded perspective view of one embodiment of the present invention.
Figure 4:
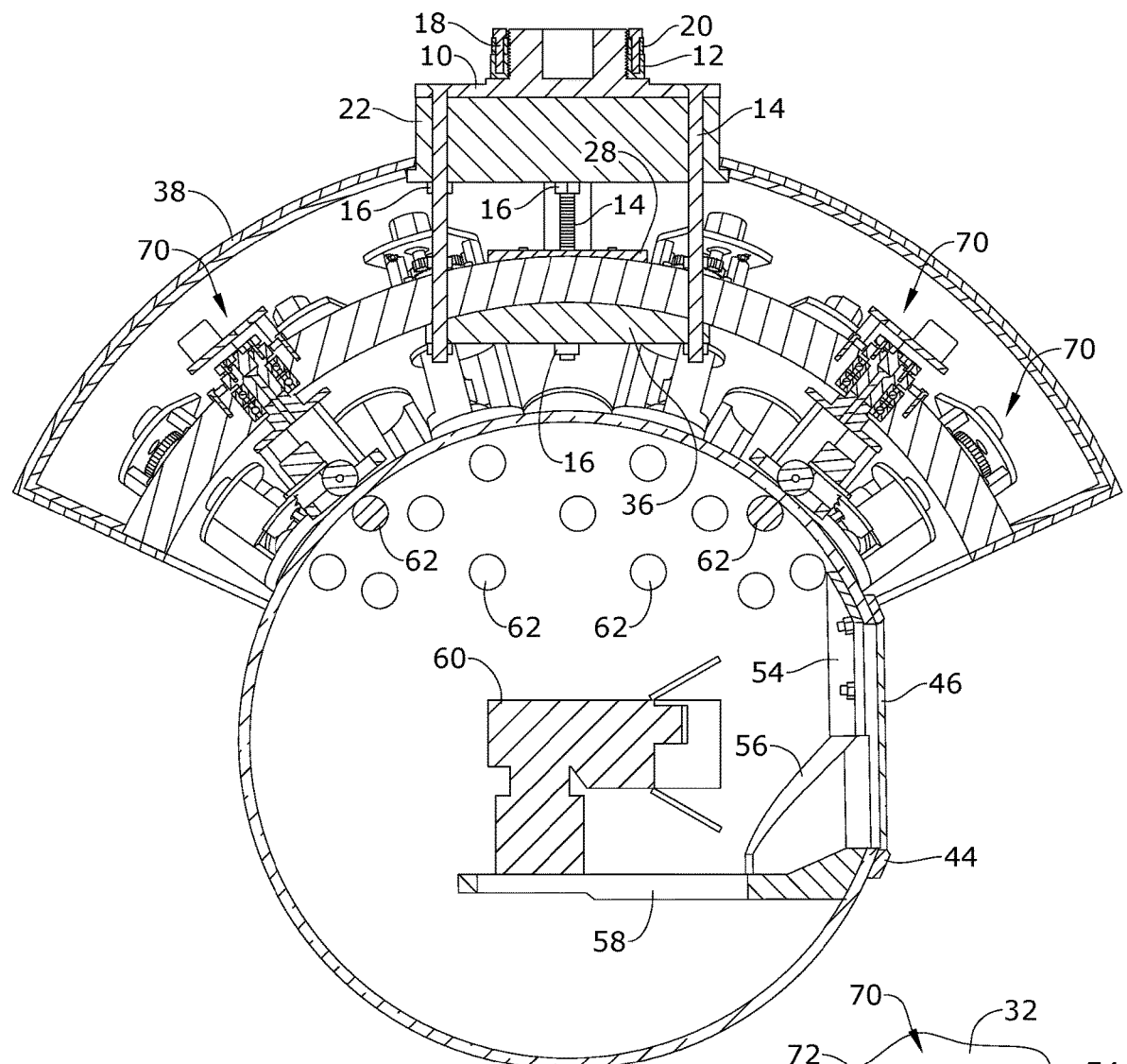
FIG. 4 shows a section view of one embodiment of the present invention taken along line 4-4 in FIG. 1.
Figure 5:
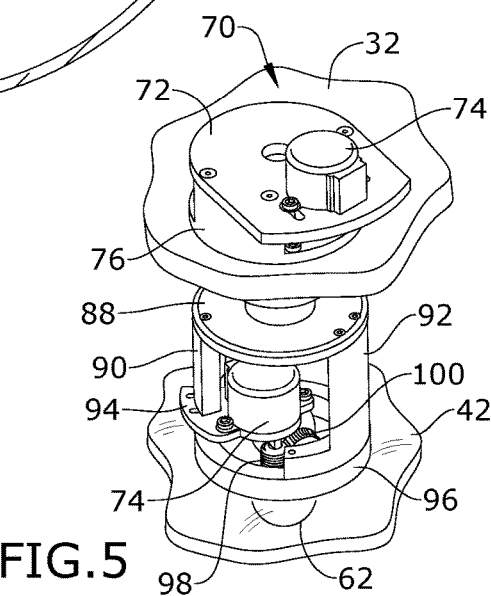
FIG. 5 shows a detail view of one embodiment of the rotator assembly of the present invention.
Figure 8:
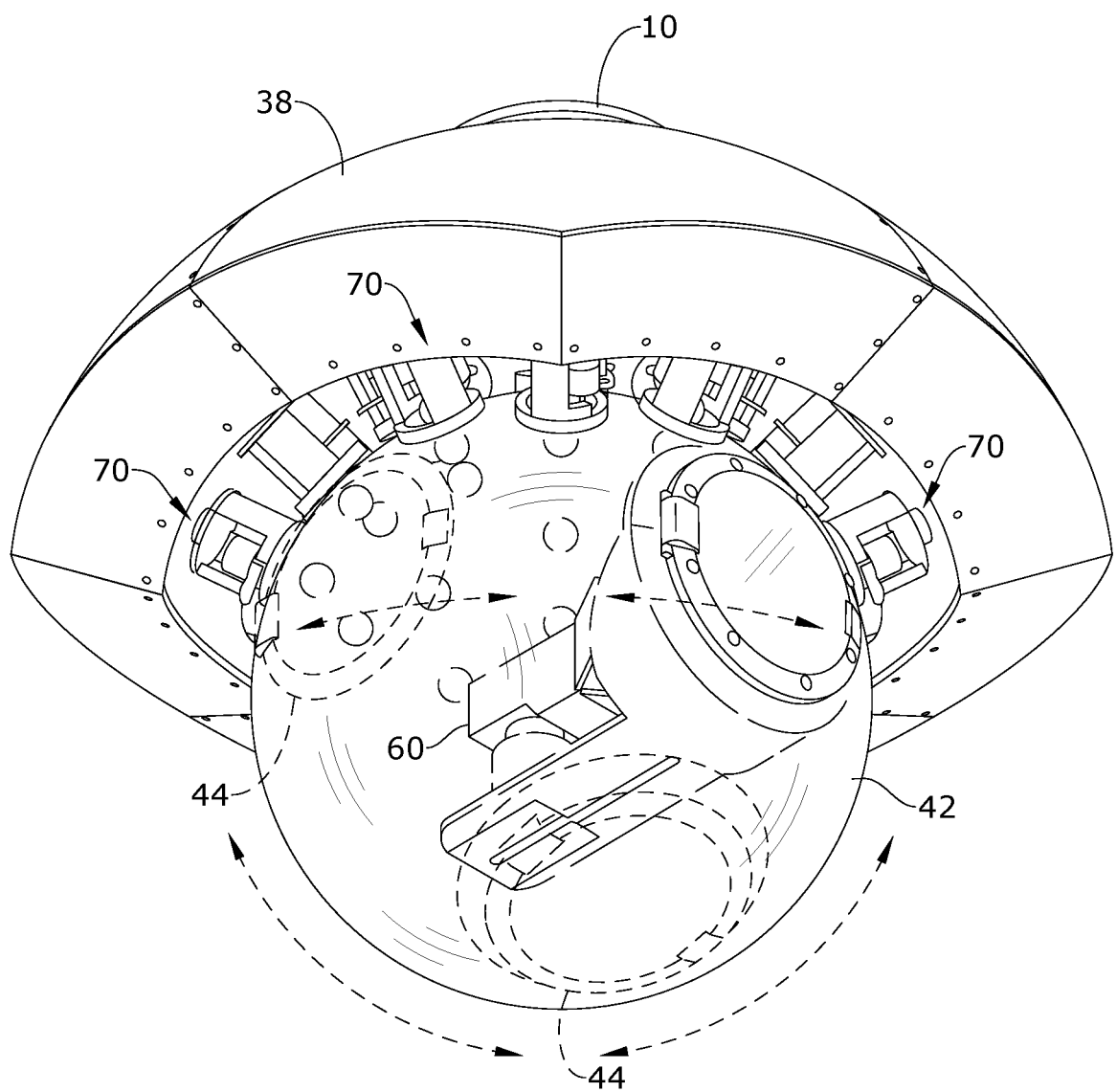
FIG. 8 shows a perspective view of one embodiment of the present invention.

By way of example, and referring to FIG. 1, one embodiment of a rotating camera head comprises a camera mount plate 10 joined to a brass ring 12 with a plurality of long mount plate bolts 14, nuts 16, brass ring screws 18 and brass ring spacers 20. A camera mount spacer 22 is adjacent to the brass ring 12 and further comprises an electrical plug 24 and data ports 26.

A top plate 28 is attached to an inner semisphere 32 with a plurality of top plate bolts 30. The camera mount spacer 22 is attached to the inner semisphere 32 with the plurality of long mount plate bolts 14 and nuts 16. The inner semisphere 32 further comprises a plurality of rotator mounting holes 34. A bottom plate 36 is attached to the inner semisphere 32 with the plurality of long mount plate bolts 14 and nuts 16.

A plurality of quarter cover panels 38 is arranged immediately against the camera mount spacer 22 such that the plurality of quarter cover panels 38 cover the inner semisphere 32. The plurality of quarter cover panels 38 is internally connected with quarter panel screws 40.

A transparent sphere 42 is attached to a door 44 having a window 46 with a hinge 48 and a latch 50. The door 44 is watertight and has an outer door ring attached to the transparent sphere 42 with a plurality of door ring bolts 52. The door 44 further comprises an inner ring top 54 and an inner ring bottom 56. The transparent sphere 42 is attached to a camera plate 58 that accommodates a camera 60. A plurality of transparent surface magnetic balls 62 are arranged against an interior surface of the transparent sphere 42.

A rotator assembly 70 is arranged through one of the plurality of rotator mounting holes 34. The rotator assembly 70 further comprises a motor plate 72 joined to a motor 74 and a spacer ring 76. The motor 74 has a shaft that mates with a pinion 80. The pinion 80 turns a coupling 82. The coupling 82 passes through a plurality of bearings 84 and a bearing ring 86.

The plurality of bearings 84 is operatively coupled to a bearing assembly having a base plate 88 joined to a first bearing wall 90, a second bearing wall 92 and a second motor 74. The second motor is held in plate with a second motor bracket 94 and an end cap 96. The second motor 74 has a shaft joined to a worm 98. The worm 98 is mated to a worm gear 100 that is attached to a shaft 102. The shaft 102 moves a ball 104.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A rotating camera head, configured to protect cameras during inclement weather; the rotating camera head comprising:
    a top plate, joined to an inner semisphere outer surface and a camera mount with a plurality of top plate bolts;
    a bottom plate, joined to an inner semisphere inner surface and the camera mount with a plurality of mount plate bolts and nuts;
    a rotator assembly, joined to an opening in the inner semisphere;
    a transparent sphere first side, arranged against a first magnetic ball in the rotator assembly;
    a transparent sphere second side opposite the transparent sphere first side;
    a second magnetic ball arranged against the transparent sphere second side opposite from the first magnetic ball;
    a waterproof door arranged on the transparent sphere;
    a camera arranged within the transparent sphere;
    a plurality of cover panels, joined to the camera mount spacer and covering the rotator assembly;
    wherein the plurality of cover panels protect the rotator assembly and the camera from inclement weather.

2. The rotating camera head of claim 1, wherein the camera mount further comprises:
    a camera mounting plate, joined to a brass ring with a plurality of brass ring screws and brass ring spacers;
    a camera mount spacer, joined to the camera mounting place,
    a plurality of ports and a plug arranged on the camera mount.

3. The rotating camera head of claim 2, wherein the rotator assembly further comprises:
    a motor plate joined to a motor,
    a gear assembly joined to the motor plate with a spacer ring; the gear assembly further comprising a spur gear joined to a pinion; a coupling joined to a base ring with a first bearing, a second bearing and a bearing washer;
    a base ring joined to a motor assembly, the motor assembly further comprising a first motor housing wall and a second motor housing wall; a bottom motor plate, joined to the first motor housing wall; an end cap, joined to the first motor housing wall and the second motor housing wall; a worm joined to a motor in the motor assembly, a worm gear, joined to a shaft passing through a first magnetic ball.

4. The rotating camera head of claim 2, wherein the waterproof door further comprising: a waterproof door ring attached to the transparent sphere with a hinge and latch.

5. The rotating camera head of claim 2, further comprising:
    a camera plate arranged within the transparent sphere proximate the waterproof door.

6. The rotating camera head of claim 1, wherein at least one of the first magnetic ball and the second magnetic ball is initially magnetically energized.

7. The rotating camera head of claim 1, wherein at both of the first magnetic ball and the second magnetic ball are initially magnetically energized.

* * * * *